US012768686B2

(12) United States Patent
Larsson et al.

(10) Patent No.: US 12,768,686 B2
(45) Date of Patent: Oct. 20, 2026

(54) FIELD DEVICE WITH A SENSOR FOR DETECTING A PHYSICAL MEASURED VARIABLE, AND CLAMPING ELEMENT FOR FASTENING A HOUSING OF A FIELD DEVICE TO A SENSOR NECK

(71) Applicant: Endress+Hauser Flowtec AG, Reinach (CH)

(72) Inventors: Björn Larsson, Birsfelden (CH); Philipp Rimkus, Lörrach (DE)

(73) Assignee: Endress+Hauser Flowtec AG, Reinach (CH)

( * ) Notice: Subject to any disclaimer, the term of this patent is extended or adjusted under 35 U.S.C. 154(b) by 275 days.

(21) Appl. No.: 18/579,395

(22) PCT Filed: Jul. 4, 2022

(86) PCT No.: PCT/EP2022/068447
§ 371 (c)(1),
(2) Date: Jan. 15, 2024

(87) PCT Pub. No.: WO2023/285190
PCT Pub. Date: Jan. 19, 2023

(65) Prior Publication Data

US 2024/0337514 A1 Oct. 10, 2024

(30) Foreign Application Priority Data

Jul. 14, 2021 (DE) ..................... 10 2021 118 265.4

(51) Int. Cl.
*G01D 11/30* (2006.01)
*F16B 2/06* (2006.01)
(Continued)

(52) U.S. Cl.
CPC .............. *G01D 11/30* (2013.01); *F16B 2/065* (2013.01); *F16B 7/042* (2013.01); *F16B 35/048* (2013.01)

(58) Field of Classification Search
CPC ......... G01D 11/30; F16B 2/065; F16B 7/042; F16B 35/048
(Continued)

(56) References Cited

U.S. PATENT DOCUMENTS 6,993,986 B2 * 2/2006 Hess ................. H01L 21/67259
73/862.541
2003/0175091 A1 * 9/2003 Aukzemas ............ F16B 41/002
411/107
(Continued)

FOREIGN PATENT DOCUMENTS

CN 1550682 A1 12/2004
CN 110383010 A1 10/2019
(Continued)

*Primary Examiner* — Stephanie E Bloss
*Assistant Examiner* — Kevin C Butler
(74) *Attorney, Agent, or Firm* — Gil M. Repa; Endress+Hauser (USA) Holding, Inc.

(57) ABSTRACT

The invention relates to a field device with a sensor for detecting a physical measured variable, comprising a housing with a sensor neck which is introduced into the housing. A rotationally symmetrical pin-shaped clamping element is introduced into a receiving element of the housing on a plane which is tangential to the rotational axis of the housing. The rotationally symmetrical pin-shaped clamping element is designed such that, by being inserted into the receiving element, the clamping element exerts a clamping force in the radial direction between the receiving element and the sensor neck so that both a movement of the sensor neck in the tubular section of the housing in the direction of the rotational axis as well as a rotation of the sensor neck in the
(Continued)

tubular section of the housing about the rotational axis are prevented.

14 Claims, 3 Drawing Sheets

(51) Int. Cl.
*F16B 7/04* (2006.01)
*F16B 35/04* (2006.01)

(58) Field of Classification Search
USPC .......................................................... 73/866.5
See application file for complete search history.

(56) References Cited

U.S. PATENT DOCUMENTS

| | | | | |
|---|---|---|---|---|
| 2009/0129883 | A1* | 5/2009 | Matheis | B23B 31/1077<br>409/234 |
| 2011/0155876 | A1* | 6/2011 | Mayer | G01D 5/244<br>248/231.81 |
| 2021/0278295 | A1* | 9/2021 | Dorneich | G01L 1/2206 |
| 2024/0167937 | A1* | 5/2024 | Müller | G01N 21/01 |

FOREIGN PATENT DOCUMENTS

| | | | | | |
|---|---|---|---|---|---|
| CN | 110670693 | A1 | | 1/2020 | |
| CN | 112955688 | A1 | | 6/2021 | |
| DE | 590969 | C | * | 4/1934 | |
| DE | 590969 | C1 | | 4/1934 | |
| DE | 102004006381 | A1 | | 10/2004 | |
| DE | 202005001879 | U1 | * | 6/2006 | G01D 11/30 |
| DE | 202007009889 | U1 | * | 11/2008 | H03K 17/945 |
| DE | 102009032814 | A1 | * | 1/2011 | F16B 37/0864 |
| DE | 102010026457 | A1 | * | 1/2012 | F16B 31/04 |
| DE | 202017101790 | U1 | * | 4/2017 | G01D 11/30 |
| DE | 102016216751 | A1 | | 9/2017 | |
| DE | 102017129789 | A1 | * | 6/2019 | G01D 11/30 |
| DE | 102021118265 | A1 | * | 1/2023 | F16B 35/048 |
| DE | 102021121686 | A1 | * | 2/2023 | B25B 5/16 |
| DE | 202023100899 | U1 | * | 5/2024 | H01R 13/5812 |
| EP | 0965822 | A2 | * | 12/1999 | G01D 11/30 |
| EP | 3219435 | A1 | * | 9/2017 | B23Q 1/0081 |
| EP | 3569352 | A1 | * | 11/2019 | B23Q 1/0072 |
| JP | 2023550207 | A | * | 11/2023 | G01N 29/32 |
| WO | WO-9641958 | A1 | * | 12/1996 | F16B 7/14 |
| WO | WO-2018177725 | A1 | * | 10/2018 | F16B 2/065 |

* cited by examiner

FIELD DEVICE WITH A SENSOR FOR DETECTING A PHYSICAL MEASURED VARIABLE, AND CLAMPING ELEMENT FOR FASTENING A HOUSING OF A FIELD DEVICE TO A SENSOR NECK

CROSS-REFERENCE TO RELATED APPLICATIONS

The present application is related to and claims the priority benefit of DPMA Patent Application No. 10 2021 118 265.4, filed on Jul. 14, 2021 and International Patent Application No. PCT/EP2022/068447, filed on Jul. 4, 2022, the entire contents of which are incorporated herein by reference.

TECHNICAL FIELD

The invention relates to field devices having a sensor for detecting a physical measured variable. Furthermore, the invention relates to a clamping element for fastening a housing of a field device to a sensor neck.

BACKGROUND

Field devices that are used in industrial installations are already known from the prior art. Field devices are often used in automation engineering as well as in manufacturing automation. In principle, all devices which are process-oriented and which supply or process process-relevant information are referred to as field devices. Field devices are thus used for detecting and/or influencing process variables. Sensor systems are used for detecting process variables. These are used, for example, for pressure and temperature measurement, conductivity measurement, flow measurement, pH measurement, fill-level measurement, etc. and detect the corresponding process variables of pressure, temperature, conductivity, pH value, fill-level, flow, etc. Actuator systems are used for influencing process variables. These are, for example, pumps or valves that can influence the flow of a fluid in a pipe or the fill level in a tank. In addition to the aforementioned measuring devices and actuators, field devices are also understood to include remote I/Os, radio adapters, or, generally, devices that are arranged at the field level.

A multitude of such field devices is produced and marketed by the Endress+Hauser group.

Typically, field devices have a housing made of metal or plastic into which the field device electronics are introduced. Furthermore, a display unit is typically screwed onto the field device housing. Moreover, a housing of a field device has an opening for connecting a sensor system, with the aid of which the process variables are detected.

For explosion protection reasons, a sensor system is usually introduced into a cylindrical insert which is introduced into the opening in the housing. To prevent an axial rotation of the cylindrical insert in the housing of the field device, or a rotation of the housing of the field device about the longitudinal axis of the cylindrical insert, the cylindrical insert is fixed to the housing with a snap ring. The cylindrical insert is then only rotatable about its longitudinal axis which is used to align the sensor system and/or the housing in the measuring point.

For fixing the sensor element relative to undesired rotations about the longitudinal axis of the cylindrical insert, for example, a fastening means in the form of a screw or a wedge is used which is guided through the housing perpendicular or parallel to the longitudinal axis of the cylindrical insert in order to exert a pressure force on the cylindrical insert and thereby fix it. Loosening and refastening the cylindrical insert, for example in order to change the orientation of the housing of the field device, is only possible using a suitable tool. The housing of the field device must often also be opened for this purpose. For example, the sensor element is fixedly introduced into a pipeline or into a container. Although the cylindrical insert cannot then be rotated, it can however be necessary to rotate the housing of the field device, for example to align a display unit of the field device with an operator.

For manufacturing and cost reasons, it has proven to be advantageous to manufacture housings of field devices from plastic. However, since the use of a said fastening means to prevent twisting of the cylindrical insert creates stresses on the housing, material fatigue can occur in a plastic housing, which results in the plastic breaking or deforming, and therefore causes the housing to leak.

Alternatively, both the opening in the housing of the field device and the cylindrical insert have a thread. The cylindrical insert is rotated into the opening until the cylindrical insert firmly contacts with the housing.

In both variants with the cylindrical insert guided into the housing and with the cylindrical insert screwed into the housing, a rubber seal in the form of an O-ring, which is located between the contact surfaces of the cylindrical insert and the housing, provides the required holding force. In this way, however, a defined fixing of the cylindrical insert cannot be achieved. The degree of fixing depends on the dimensions of the screwed-in thread section of the cylindrical insert. Correctly adjusting the fixing requires precise coordination between the cylindrical insert and the housing.

DE 10 2017 129 789 A1 has disclosed a fastening system for a sensor element in which a fastening ring is provided which ensures the mechanical clamping force between the housing and the sensor neck. However, this connection can be loosened by vibrations, for example.

Proceeding from this problem, the invention is based on the object of providing an alternative fastening system for a field device which allows a safe, simple and vibration-stable fastening of a sensor neck of a sensor to the housing of the field device.

The object is achieved by a field device according to claim 1 and by a clamping element according to the present disclosure.

SUMMARY

With regard to the field device, it is provided that it is equipped with a sensor for detecting a physical measured variable and comprises:

- a housing having a tubular section, wherein the tubular section has a rotational axis and a first diameter, wherein the housing has a receiving element which is arranged tangentially in a plane normal to the rotational axis on the tubular section;
- the sensor, which has a substantially tubular sensor neck with a second diameter, wherein the second diameter is smaller than the first diameter, wherein the sensor neck is guided into the tubular section of the housing,
- a pin-shaped, rotationally symmetrical clamping element with a first end region, a second end region, an elastic region with a mean diameter and a contacting region with a third diameter, wherein the third diameter is greater than the mean diameter, wherein the contacting region is arranged between the first end region and the elastic region, between the elastic region and the second end region, or between two subsections of the elastic region, wherein the second end region has a thread, and wherein the receiving element is designed to receive the clamping element and has a mating thread for receiving the thread of the clamping element, wherein the clamping element is designed to exert a clamping force in the radial direction between the receiving element and the sensor neck by being inserted into the receiving element and screwing the thread into the mating thread at a predetermined first depth by means of the contacting region so that both a movement of the sensor neck in the tubular section of the housing in the direction of the rotational axis and a rotation of the sensor neck in the tubular section of the housing about the rotational axis are prevented.

The field device according to the invention therefore has a clamping mechanism for fastening the sensor neck to the housing, which clamping mechanism can be used in a simple and reliable manner. By screwing the thread of the clamping element into the mating thread of the receiving element, the contacting region is pushed between the sensor neck and a wall of the receiving element so that a clamping between the sensor neck and the clamping element is achieved. The clamping force resulting from a spring-like bending of the clamping element is so great that both a rotation of the sensor neck and an axial displacement of the sensor neck in the housing is prevented. By using the threaded connection between the clamping element and the receiving element, the clamping element is not spontaneously displaceable in the tangential direction, for example due to vibrations, so that the clamping reliably exists even over a longer period of time. The elastic region guarantees a reliable function of the clamping mechanism independent of the ambient temperature or any manufacturing tolerances of the employed components. Both the expansion in the clamping element and its bending counteract the vibration.

The "mean diameter" of the elastic region means that the elastic region does not have to have the same diameter over its entire length, but can also have a thickening/taper with, for example, a linear profile. The mean diameter is the mean value of the profile of the diameter along the length of the elastic region.

Examples of field devices have already been listed in the introductory part of the description. The invention is suitable for all types of field devices in which the sensor has a sensor neck inserted into the housing of the field device, for example pressure measuring devices, ultrasound measuring devices, etc.

According to an advantageous embodiment of the field device according to the invention, it is provided that the clamping element has a first guide element arranged between the elastic region and the first end region, wherein the first guide element has a fourth diameter, and wherein the fourth diameter is greater than or equal to a maximum diameter of the elastic region. The first guide element prevents excessive expansion or bending of the clamping element in the direction of the first end region. Since the elastic region is thinner than the first guide element, a bending or expansion preferably takes place in the elastic region.

According to an advantageous embodiment of the field device according to the invention, it is provided that the clamping element has a second guide element arranged between the elastic region and the second end region, wherein the second guide element has a fifth diameter, and wherein the fifth diameter is greater than or equal to a maximum diameter of the elastic region. Since the elastic region is therefore substantially thinner than the second guide element, a bending or expansion preferably takes place in the elastic region.

According to an advantageous embodiment of the field device according to the invention, it is provided that the thread has a sixth diameter, and wherein the fifth diameter is greater than the sixth diameter. An extension at the level of the second end region, which constitutes a load for the thread, is thereby prevented.

According to an advantageous embodiment of the field device according to the invention, it is provided that the receiving element is designed to be tubular in sections with a seventh diameter, wherein the seventh diameter is greater than the third diameter, greater than the fourth diameter and greater than the fifth diameter.

According to an advantageous embodiment of the field device according to the invention, it is provided that the first end region has a stop element with an eighth diameter, wherein the eighth diameter is greater than the seventh diameter.

Due to these embodiments of the seventh and eighth diameters, the clamping element can be easily inserted into the receiving element, wherein at the same time an end position of the clamping element can be realized. The lengths of the clamping element and/or the receiving element are coordinated in such a way that the thread is not overrotated when the end position of the clamping element is reached in the receiving element.

According to an advantageous embodiment of the field device according to the invention, it is provided that the stop element has a receptacle for transmitting torque, in particular by means of a screwdriver or an Allen key, external hexagon key or Torx key. This makes it easier to screw in the clamping element. The use of alternative screw profiles is also conceivable.

According to an advantageous embodiment of the field device according to the invention, it is provided that the sensor neck has a circumferential groove on the outwardly directed side, wherein regions of the sensor neck above and below the groove are designed to receive the contacting region of the clamping element after insertion of the clamping element into the receiving element so that movement of the sensor neck in the tubular section of the housing in the direction of the rotational axis is prevented, wherein the thread is screwed into the mating thread to a predetermined second depth, wherein the first predetermined depth is deeper than the second predetermined depth. The clamping element is therefore in a position in which the sensor neck can be rotated in the housing.

According to an advantageous embodiment of the field device according to the invention, it is provided that the tubular section of the housing has at least two support surfaces, in particular designed as bars or ribs, on the inner side, wherein the support surfaces each rest above and below the groove on a region of the sensor neck, wherein the support surfaces are spaced apart from one another on a circumference of the tubular section at a distance of 120°.

According to an advantageous embodiment of the field device according to the invention, it is provided that the support surfaces are designed in such a way that two of the support surfaces in each case exert a radial clamping force between the tubular section of the housing and the sensor neck when the clamping force is exerted in the radial direction between the receiving element and the sensor neck.

The support surfaces therefore serve two functions: on the one hand, they prevent tilting of the sensor neck in the housing when the clamping element is in the position in which the sensor neck is not rotatable in the housing. On the other hand, the support surfaces serve to distribute the clamping force to a plurality of elements, i.e. to two of the support surfaces and to the contacting region of the clamping element. In contrast to the variant in which the clamping force acts on the sensor neck exclusively via the contacting region of the clamping element, the stability of the fastening is increased, and the load on the individual components is reduced.

The support surfaces thereby define the first diameter. It must be noted that the second diameter of the sensor neck is selected to be smaller than the first diameter.

According to an advantageous embodiment of the field device according to the invention, it is provided that the sensor neck has a diameter smaller than the second diameter below the region on which the support surfaces rest. This prevents the sensor neck from being clamped in the tubular section in this region should a slight temporary tilting occur during the establishment of the clamping force by means of the clamping element.

According to an advantageous embodiment of the field device according to the invention, it is provided that the clamping element is made of a metallic material or of a plastic, in particular of a fiber-reinforced or sphere-reinforced plastic.

According to an advantageous embodiment of the field device according to the invention, it is provided that the housing is made of a metal, in particular aluminum or a stainless steel, or of a plastic.

With regard to the clamping element, it is provided that the clamping element is designed for fastening a housing of a field device to a sensor neck, wherein the clamping element is pin-shaped and has a rotationally symmetrical shape with a first end region, a second end region, an elastic region with a mean diameter, and a contacting region with a third diameter, wherein the third diameter is greater than the first mean diameter and greater than the second mean diameter, wherein the contacting region is arranged between the first end region and the elastic region, between the elastic region and the second end region, or between two subsections of the elastic region, and wherein the second end region has a thread.

BRIEF DESCRIPTION OF THE DRAWINGS

The present disclosure is explained in greater detail with reference to the following figures. in which.

DETAILED DESCRIPTION

Figure 1:
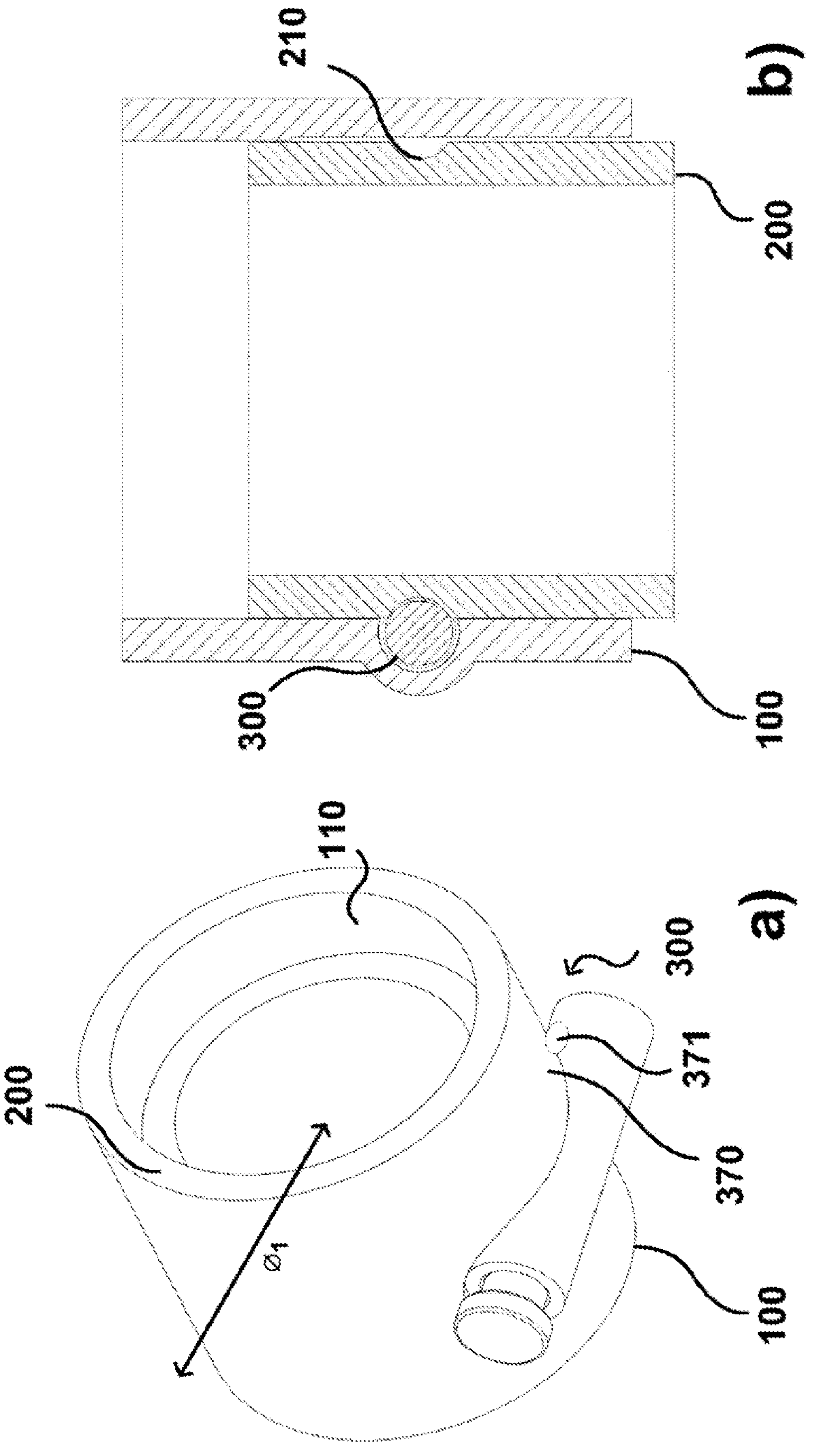
FIG. 1 shows an exemplary embodiment of the field device according to the present disclosure.

FIG. 1 shows an exemplary embodiment of the field device according to the invention. A tubular section 100 of the housing 1 of the field device, and a section of the sensor neck 200 inserted into the housing, are shown here. FIG. 1*a*) shows an outer view, and FIG. 1*b*) shows a longitudinal section through the field device.

The field device serves to detect a physical measured variable, for example relating to a process engineering process. For this purpose, the measuring device has the sensor. For example, the sensor is a pressure or ultrasonic sensor. The housing 1 of the field device has the electronics of the field device, wiring, interfaces, display elements, and/or input elements. The housing typically consists of a metal, in particular aluminum or a stainless steel, or of a plastic.

Figure 3:
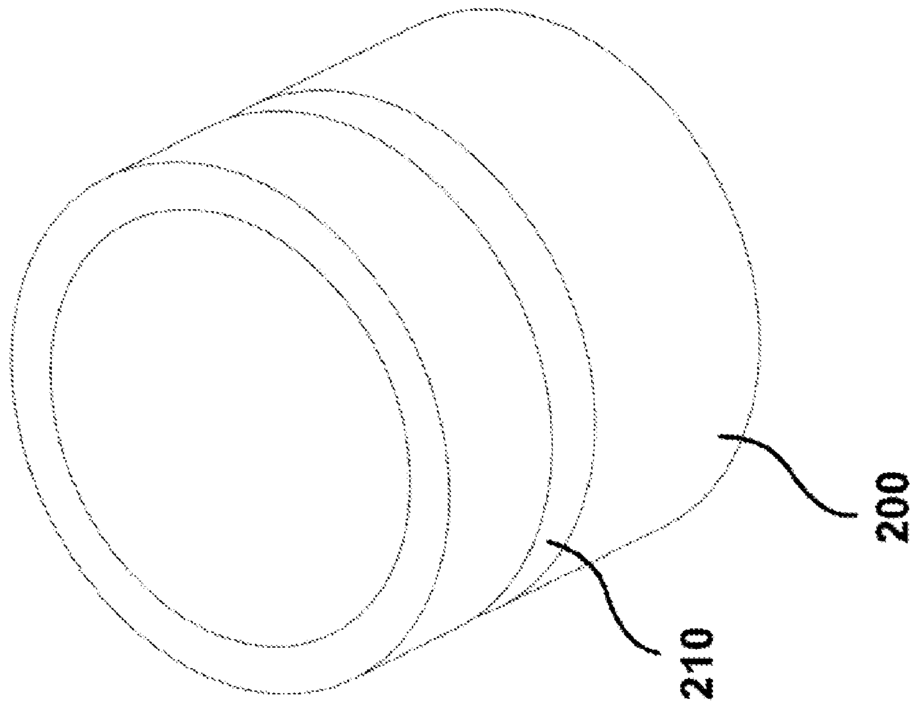
FIG. 3 shows an embodiment of the sensor neck.

To fasten the sensor to the housing 1 of the field device, the sensor neck 200 of the sensor is inserted into the tubular section 100 of the housing 1. The sensor neck 200 is shown in FIG. 3. In particular, this consists of a metallic material, is cylindrical with a second diameter $ø_2$, and has a circumferential circular groove 210. The second diameter $ø_2$ above and/or below the groove. The regions above and below the groove can also have different diameters, but not greater than the first diameter $ø_1$.

Figure 4:
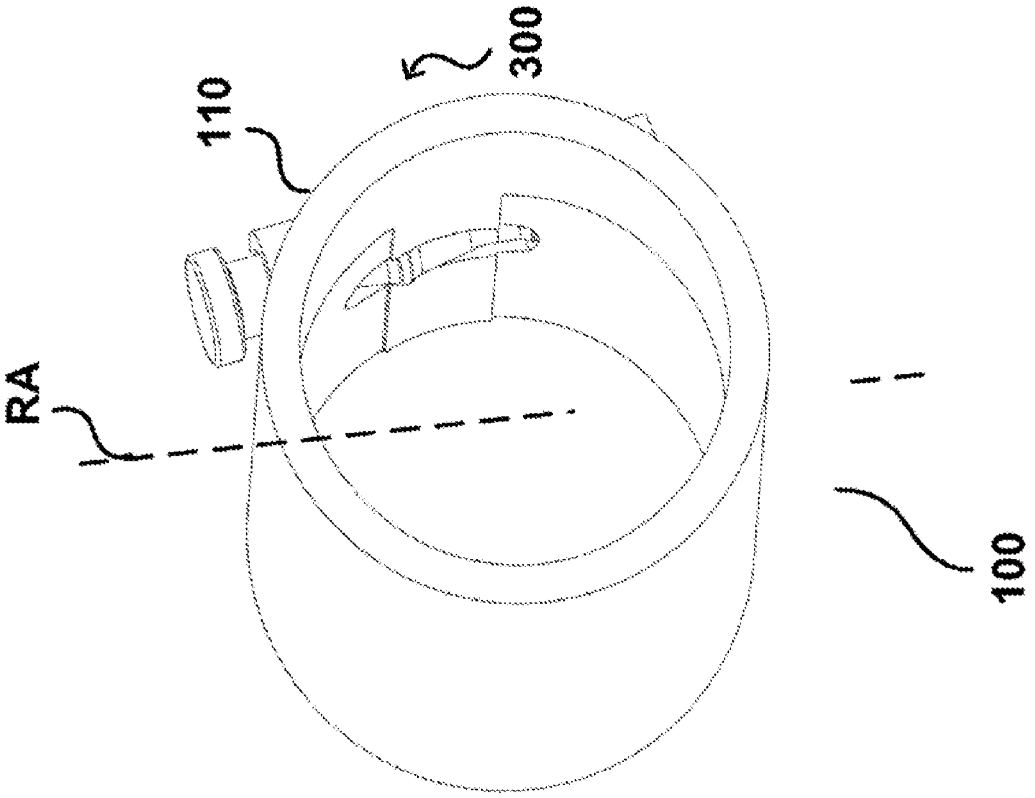
FIG. 4 shows an embodiment of the tubular section of the housing.

The tubular section 100 of the housing 1 has a first cross-section $ø_1$. A receiving element 110 is attached in a tangential plane of the tubular section 100. In its basic shape, this consists of a tube with a seventh diameter $ø_7$. The receiving element 110 is shaped such that it is open toward the inside of the tubular section. This is clarified in FIG. 4, which shows the tubular section 100 without the inserted sensor neck.

To fix the sensor neck 200 in the tubular section 100, a clamping element 300 is inserted into the receiving element 110. The clamping element 110 is pin-shaped and rotationally symmetrical and has a first end region 310 and a second end region 320. A thread with a sixth diameter $ø_6$ is attached to the second end region 320, which is rotated into a mating thread of the receiving element 110. The first end region 310 has a stop element 370 with an eighth diameter $ø_8$, wherein $ø_8$ is greater than $ø_7$, which defines an end position of the clamping element 300 in the receiving element 110.

The clamping element 340 has a contacting region 340 with a third diameter $ø_3$. The contacting region 340 projects through the opening in the receiving element 110 and the tubular section 100 into the interior of the housing and contacts the groove 210 of the sensor neck.

If the thread of the clamping element 300 is further rotated into the mating thread of the receiving element 110, the clamping element 300 moves in the tangential direction toward the sensor neck 200. The stop element 370 has a receptacle for torque transmission 371, which, for example, allows a screwdriver or an Allen key to be received.

The clamping element undergoes a slight elongation, and the contacting area 340 presses successively harder on the sensor neck 200 due to the increasing spring force of the clamping element 300, henceforth referred to as clamping force. In order to be able to achieve this effect independently of the temperature and any production tolerances, the clamping element 300 has an elastic region 330 which has a mean diameter which is smaller than the third diameter $ø_3$. So that the elongation is preferably effected in this elastic region 340, the clamping element has a first guide element 350 with a fourth diameter $ø_4$, arranged between the elastic region 330 and the first end region 310, and a second guide element 360 with a diameter $ø_5$, arranged between the elastic region 330 and the second end region 320. The fourth and fifth diameters $ø_4$, $ø_5$ must be greater than the third diameter for this purpose. Advantageously, the clamping element 300 consists of a metallic material or of a plastic, in particular of a fiber-reinforced or sphere-reinforced plastic.

Figure 2:
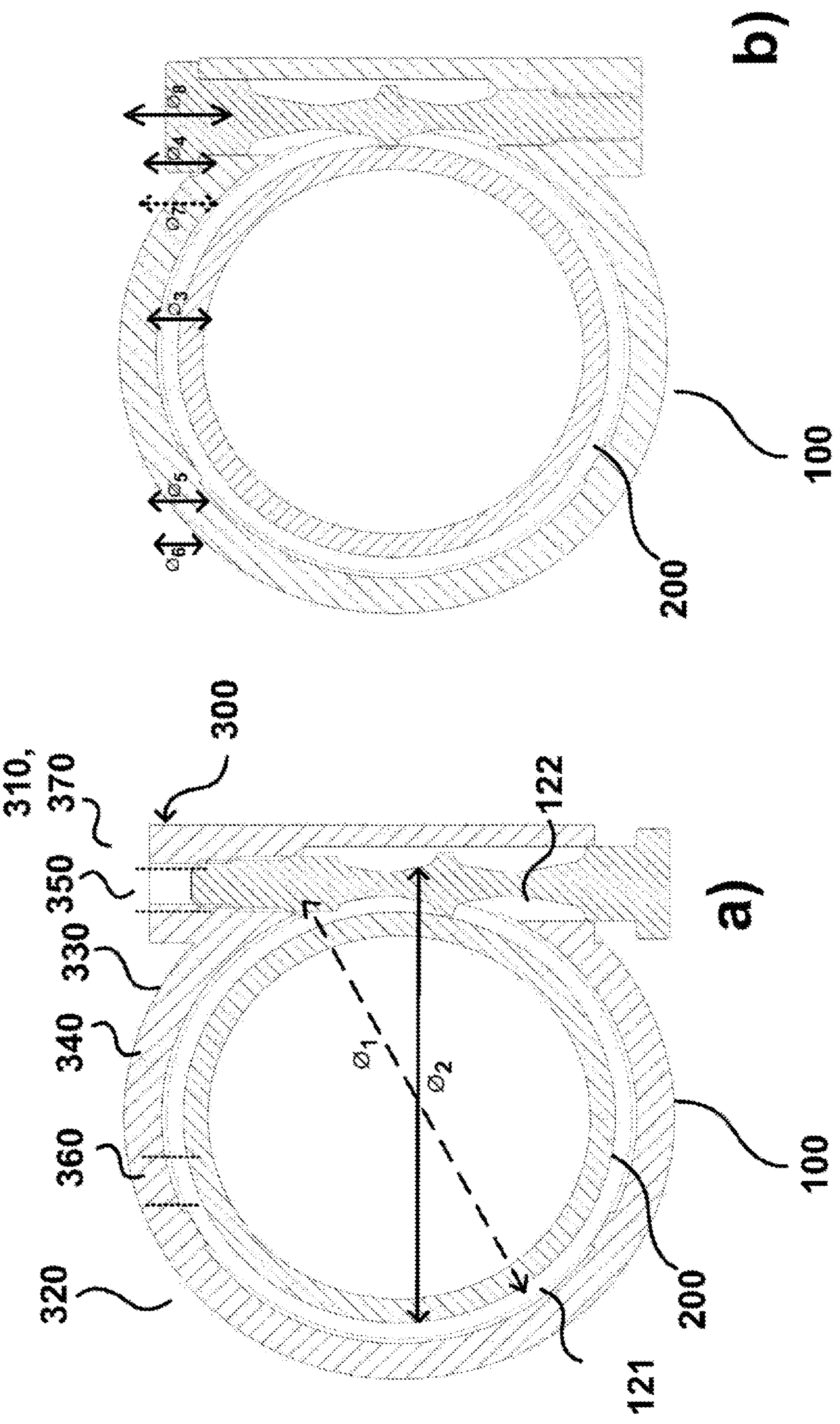
FIG. 2 shows a cross-section through the clamping system in two positions.

If the clamping force is sufficiently high, a displacement of the sensor neck 200 relative to the tubular section 100, as well as a rotation of the sensor neck 200 about its longitudinal axis, is prevented, see FIG. 2*b*).

Since the contacting region 340 is designed such that it can be inserted into the groove 210, a displacement of the sensor neck 200 relative to the tubular section 100 is already prevented in a position of the clamping element 300 in the receiving element 110 when no or only a small clamping force is applied, see FIG. 2*a*). In this state, however, the sensor neck 200 is rotatable about its longitudinal axis, which is used, for example, to align the sensor.

For stability reasons, the tubular section 2 preferably has 3 receiving surfaces 121, 122 in the form of pins or knobs. These pins or knobs are designed such that they rest on the sensor neck 200 in the region above and/or below the groove. The support surfaces 121, 122 substantially serve two functions: firstly, to prevent tilting of the sensor neck 200 in the tubular section 100, and secondly, to distribute the clamping force over the sensor neck 200.

The fastening method according to the invention allows the sensor neck 200 to be fixed to the tubular section 100 in a simple and very reliable manner. The fastening is vibration-resistant and nevertheless detachable at any time by unscrewing the clamping element 300.

The invention claimed is:

1. A field device having a sensor for detecting a physical measured variable, comprising:

a housing having a tubular section, wherein the tubular section has a rotational axis and a first diameter, wherein the housing has a receiving element which is arranged tangentially in a plane normal to the rotational axis on the tubular section;

the sensor, which has a substantially tubular sensor neck with a second diameter, wherein the second diameter is smaller than the first diameter, wherein the sensor neck is guided into the tubular section of the housing, a pin-shaped, rotationally symmetrical clamping element with a first end region, a second end region, an elastic region with a mean diameter and a contacting region with a third diameter, wherein the third diameter is greater than the mean diameter, wherein the contacting region is arranged between the first end region and the elastic region, between the elastic region and the second end region, or between two subsections of the elastic region, wherein the second end region has a thread, and wherein the receiving element is designed to receive the clamping element and has a mating thread for receiving the thread of the clamping element, wherein the clamping element is designed to exert a clamping force in the radial direction between the receiving element and the sensor neck by being inserted into the receiving element and screwing the thread into the mating thread at a predetermined first depth using the contacting region so that both a movement of the sensor neck in the tubular section of the housing in the direction of the rotational axis and a rotation of the sensor neck in the tubular section of the housing about the rotational axis are prevented.

2. The field device of claim 1, wherein the clamping element has a first guide element arranged between the elastic region and the first end region, wherein the first guide element has a fourth diameter, and wherein the fourth diameter is greater than or equal to a maximum diameter of the elastic region.

3. The field device of claim 2, wherein the clamping element has a second guide element arranged between the elastic region and the second end region, wherein the second guide element has a fifth diameter, and wherein the fifth diameter is greater than or equal to a maximum diameter of the resilient elastic region.

4. The field device of claim 3, wherein the thread has a sixth diameter, and wherein the fifth diameter is greater than the sixth diameter.

5. The field device of claim 4, wherein the receiving element is tubular in sections with a seventh diameter, wherein the seventh diameter is greater than the third diameter, greater than the fourth diameter and greater than the fifth diameter.

6. The field device of claim 5, wherein the first end region has a stop element with an eighth diameter, wherein the eighth diameter is greater than the seventh diameter.

7. The field device of claim 6, wherein the stop element has a receptacle for transmitting torque.

8. The field device of claim 1, wherein the sensor neck has a circumferential groove on the outwardly facing side, wherein the groove is designed to receive the contacting region of the clamping element after the clamping element has been inserted into the receiving element so that a movement of the sensor neck in the tubular section of the housing in the direction of the rotational axis is prevented, but a rotation of the sensor neck in the tubular section of the housing about the rotational axis is made possible, wherein the thread is screwed into a predetermined second depth into the mating thread, wherein the predetermined first depth is deeper than the second predetermined depth.

9. The field device of claim 8, wherein the tubular section of the housing in the inner side has at least two support surfaces, wherein the support surfaces each rest above and below the groove on a region of the sensor neck, wherein the support surfaces are spaced apart from one another on a circumference of the tubular section at a distance of 120°.

10. The field device of claim 9, wherein the support surfaces are designed in such a way that two of the support surfaces exert a radial clamping force between the tubular section of the housing and the sensor neck when the clamping force is exerted in the radial direction between the receiving element and the sensor neck.

11. The field device of claim 10, wherein the sensor neck below the region on which the support surfaces rest is smaller than the second diameter.

12. The field device of claim 1, wherein the clamping element is made of a metallic material or a plastic.

13. The field device of claim 1, wherein the housing is made of a metal or a plastic.

14. A clamping element for fastening a housing of a field device to a sensor neck, wherein the clamping element is pin-shaped and has a rotationally symmetrical shape, including a first end region, a second end region, an elastic region having a mean diameter, and a contacting region having a third diameter, wherein the third diameter is greater than the mean diameter, wherein the contacting region is arranged between the first end region and the elastic region, between the elastic region and the second end region, or between two subsections of the elastic region, and wherein the second end region has a thread; and wherein the clamping element is designed to exert a clamping force in a radial direction between a receiving element of the housing and a sensor neck of the sensor.

* * * * *